US011675347B2

(12) United States Patent
Moore

(10) Patent No.: US 11,675,347 B2
(45) Date of Patent: Jun. 13, 2023

(54) INDUSTRIAL MACHINE MONITORING DEVICE

(71) Applicant: LeClaire Manufacturing Company, Bettendorf, IA (US)

(72) Inventor: Robert Andrew Moore, Bettendorf, IA (US)

(73) Assignee: LeClaire Manufacturing Company, Bettendorf, IA (US)

( * ) Notice: Subject to any disclaimer, the term of this patent is extended or adjusted under 35 U.S.C. 154(b) by 586 days.

(21) Appl. No.: 15/611,522

(22) Filed: Jun. 1, 2017

(65) Prior Publication Data

US 2018/0348745 A1    Dec. 6, 2018

(51) Int. Cl.
*G05B 23/02*    (2006.01)
*G05B 19/418*    (2006.01)

(52) U.S. Cl.
CPC ....... *G05B 23/0272* (2013.01); *G05B 19/418* (2013.01)

(58) Field of Classification Search
CPC .................................................. G05B 23/0216
See application file for complete search history.

(56) References Cited

U.S. PATENT DOCUMENTS

| 6,489,884 | B1 | 12/2002 | Lamberson et al. | |
| 7,123,980 | B2 | 10/2006 | Funk et al. | |
| 8,239,055 | B2* | 8/2012 | Grove .................... | G05B 15/02 700/108 |
| 8,291,121 | B2* | 10/2012 | Papadopoulos ........ | G05B 19/05 700/38 |

(Continued)

FOREIGN PATENT DOCUMENTS

CN    103944260 A  *  7/2014

OTHER PUBLICATIONS

Managing Alarms in Vijeo Citect 2015.pdf http://www2.schneider-electric.com/resources/sites/SCHNEIDER_ELECTRIC/content/live/FAQS/304000/FA304332/ru_RU/Managing%20Alarms%20in%20Vijeo%20Citect%202015.pdf (Year: 2015).*

(Continued)

*Primary Examiner* — Mohammad Ali
*Assistant Examiner* — David Earl Ogg
(74) *Attorney, Agent, or Firm* — Goodhue, Coleman & Owens, P.C.

(57) ABSTRACT

A method for remote monitoring of an industrial machine having a relay based or PLC based controller includes steps of providing a hardware interface module for directly interfacing with the relay based or PLC based controller of the industrial machine, directly interfacing the hardware interface module with the relay based or PLC based controller to identify occurrence of power cycles of the industrial machine, registering the hardware interface module through a portal accessible through a network, communicating the occurrence of the power cycles of the industrial machine detected with the hardware interface module to a database in operative communication with the portal and storing the occurrence of the power cycles within the database, and providing a user interface indicative of performance of the industrial machine based on the power cycles of the industrial machine detected with the hardware interface module and stored in the database.

15 Claims, 8 Drawing Sheets

(56) References Cited

U.S. PATENT DOCUMENTS

| | | | | |
|---|---|---|---|---|
| 8,898,036 | B2* | 11/2014 | Sittler | G01M 13/028 |
| | | | | 702/184 |
| 9,390,600 | B1 | 7/2016 | Sirotkin | |
| 2002/0077711 | A1* | 6/2002 | Nixon | C10G 11/187 |
| | | | | 700/51 |
| 2007/0208434 | A1 | 9/2007 | Yeh et al. | |
| 2008/0007208 | A1* | 1/2008 | Comery | G01R 31/367 |
| | | | | 320/107 |
| 2009/0265571 | A1 | 10/2009 | Furukawa et al. | |
| 2011/0273303 | A1 | 11/2011 | Keever et al. | |
| 2011/0282626 | A1 | 11/2011 | Rikkola et al. | |
| 2014/0337429 | A1 | 11/2014 | Asenjo et al. | |
| 2016/0012707 | A1 | 1/2016 | McKinley et al. | |
| 2019/0304266 | A1 | 10/2019 | Fayfield | |

OTHER PUBLICATIONS

Sensaphone Sentinal 2_1.PDF https://pdf.crutchfieldonline.com/ImageBank/v20151117123300/Manuals/721/721SCD1200.PDF (Year: 2015).*

Citect, "CitectSCADA Version 7.0 User Guide", 2007, Citect Pty Ltd, pp. 1-4 (Year: 2007).*

International Search Report and Written Opinion for PCT/US18/35176, dated Aug. 13, 2018.

International Preliminary Report on Patentability, PCT/US18/35176, dated Aug. 20, 2019, 24 pages.

* cited by examiner

FIG. 8

LECLAIRE MANUFACTURING
3225 ZIMMERMAN DRIVE 52722

HOURS PER DAY OF OPERATION: 24

DAYS PER WEEK OF OPERATION: 5

[SAVE] [ADD CHILD] [ADD EQUIPMENT]

- LECLAIRE MANUFACTURING
  - EAGLE WATCH
  - MACHINE SHOP
    - HORIZONTAL MACHINES
      - CNC#23
    - VERTICAL MACHINES
  - PATTERN SHOP
  - FOUNDRY
  - BLASTING
    - SPINNER BLASTER
      - SPIN BLASTER #1
      - SPIN BLASTER #2
      - SPIN BLASTER #3
    - TUMBLER BLASTER
      - TUMBLE BLASTER #1
      - TUMBLE BLASTER #2
  - CORE
    - GAYLORD
      - LARGE GAYLORD
    - LAEMPE
      - LAEMPE 1
      - LAEMPE 2
      - LAEMPE 3
  - FINISHING
  - PERMANENT MOLDING

302:
- ORGANIZATION
  - COMPANY
  - DEVICES
- ADMINISTRATION
  - TEAM SETTINGS
  - MANAGE YOUR TEAM
    - MEMBERS
    - ADD A MEMBER
  - INVITATIONS

INDUSTRIAL MACHINE MONITORING DEVICE

FIELD OF THE INVENTION

The present invention relates to methods and systems for monitoring industrial machines.

BACKGROUND

The ability to monitor industrial machines holds the promise of improved resource management, increased efficiencies, and reduced costs. If industrial machines can be remotely monitored they can potentially be better managed and additional insights can be gained. However, there are been a number of obstacles to one's ability to meaningfully monitor industrial machines in a typical environment.

Consider, for example, a typical foundry. A foundry may have a number of different types of machines such as metal casting machines, metal molding machines, continuous casting machines, die casting machines, hot chamber machines, cold chamber machines, CNC lathe machines, milling machines, and furnaces. In any one particular facility, there may be multiple types of machines of different age and from different manufacturers. While it may be possible to buy a new machine that includes the ability to communicate over a network or be monitored remotely, this functionality would not extend to existing machines or machines from different manufacturers. Moreover, industrial machine manufacturers may make such systems proprietary.

Thus, one of the problems is that some of the industrial machines or equipment in a foundry are legacy machines that may be dozens of years old. Another one of the problems is that different machines within a typical foundry may be from different manufacturers. Thus, solutions which only provide for monitoring of new machines, or new machines from the same manufacturer do not accomplish what is needed.

What is needed is a solution which allows for monitoring of industrial machines which may be used in diverse industrial environments including to monitor machines of different ages and machines from different manufacturers. Moreover, what is needed is a solution which allows for data to be collected which may be used to improve operation of a machine or a facility.

SUMMARY

Therefore, it is a primary object, feature, or advantage of the present invention to improve over the state of the art.

It is a further object, feature, or advantage of the present invention to provide for monitoring of industrial machines regardless of age, type, or manufacturer such that a single system may be used to monitor all industrial machines associated with an enterprise, even if the enterprise expands across multiple sites or locations.

It is a still further object, feature, or advantage of the present invention to provide for collecting information regarding operation of industrial machines, including the reasons for downtime of the machines.

Another object, feature, or advantage is to analyze data collected from the industrial machines to provide insight into operation of the machine relative to other machines.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

The proposed invention relates to methods and systems for monitoring of industrial machines which use relay logic or PLCs which involves providing this information to a cloud-based database in order to monitor the current machine status, provide data for capacity analysis, and provide data analytics to comparable machines including machines at different and unrelated facilities.

According to one aspect, a method for remote monitoring of an industrial machine having a relay based or PLC based controller includes providing a hardware interface module for directly interfacing with the relay based or PLC based controller of the industrial machine, directly interfacing the hardware interface module with the relay based or PLC based controller to identify occurrence of power cycles of the industrial machine, registering the hardware interface module through a portal accessible through a network, communicating the occurrence of the power cycles of the industrial machine detected with the hardware interface module to a database in operative communication with the portal and storing the occurrence of the power cycles within the database, and providing a user interface indicative of performance of the industrial machine based on the power cycles of the industrial machine detected with the hardware interface module and stored in the database.

According to another aspect, a system for remote monitoring of an industrial machine having a relay based or PLC based controller is provided. The system includes a hardware interface module for directly interfacing with the relay based or PLC based controller of the industrial machine in order to identify occurrence of power cycles of the industrial machine, an online portal operating on a computing platform and programmed to provide for registering the hardware interface module through a portal accessible through a network, and a database in operative communication with the online portal. The online portal has an associated user interface indicative of performance of the industrial machine based on the power cycles of the industrial machine detected with the hardware interface module and stored in the database.

BRIEF DESCRIPTION OF THE DRAWINGS

Illustrated embodiments of the disclosure are described in detail below with reference to the attached drawing figures, which are incorporated by reference herein.

FIG. 8 is a screen display of a user interface that allows for setting up an organization and its industrial machines or devices.

DETAILED DESCRIPTION

Figure 1:
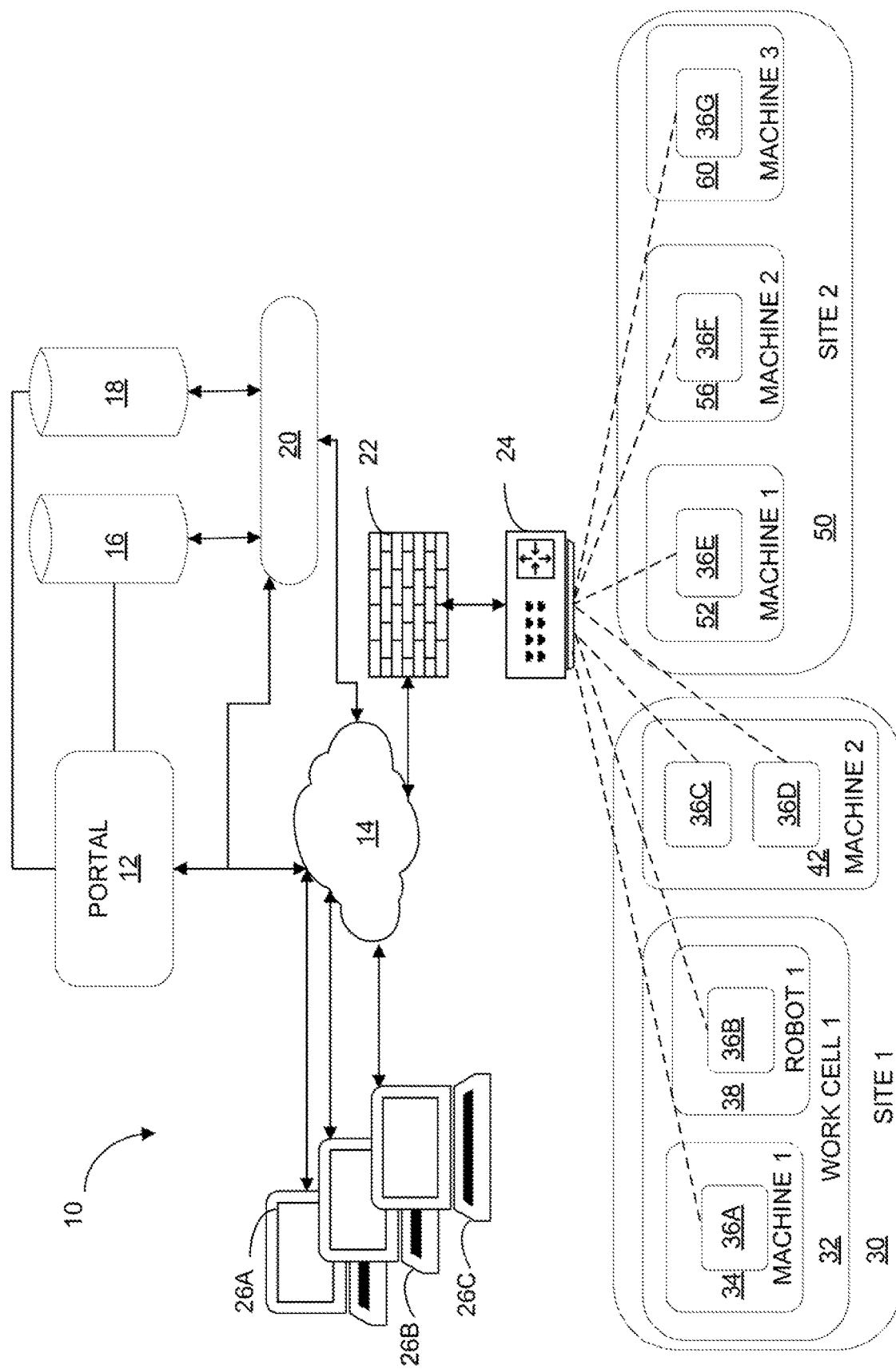
FIG. 1 illustrates one example of a system for monitoring industrial machines.

FIG. 1 provides an overview of one example of a system 10 which may be used in accordance with one aspect of the invention. As shown in the system 10, a portal 12 is shown. The portal may be a web-based portal accessible over the internet 14. The portal 12 may be accessible to users of the hardware interface modules which are used to monitor industrial machines. The portal in in operative communication with databases 16, 18. A computing platform 20 is shown. One example of a computing platform that may be used is AWS Lambda which is a part of the Amazon Web Services provided by Amazon. AWS Lambda is an event-driven serverless computing platform. Of course, other types of computing platforms may be used including those which are server-based. The portal 12 may provide a number of different features including data aggregation across customers, statistical process control (SPC), machine learning, device management, text/email/in-user interface alerts, process data trending, and predictive maintenance and monitoring mean time between failures (MTBF).

Although any number of different types of network configurations are possible, a firewall 22 is shown operatively connected to the internet 14. A router which 24 which may be a wireless router 24 is shown. The router 24 is in operative communication with hardware interface modules 36A, 36B, 36C, 36D, 36E, 36F, 36G. The hardware interface modules 36A, 36B, 36C, 36D, 36E, 36F, 36G each provide for interfacing with a relay based or PLC based controller of an industrial machine. As shown in FIG. 1 a first site 30 includes a first work cell 32. Within the work cell 32 is a first machine 34 with a first hardware interface module 36A used to interface with the relay based or PLC based controller of the first machine 34. Also within the same work cell 32 is a first robot 38. The second hardware interface module 36B is operatively connected to the first robot 38. A second machine 42 is also located at the first site 30 but not a part of the first work cell 32. This second machine has multiple hardware interface modules 36C, 36D.

A second site 50 is also shown. This second site 50 has a first machine with another hardware interface module 36E, a second machine 56 with hardware interface module 36F and a third machine 60 with hardware interface module 36G. The first site 30 and the second site 50 may be different sites of a particular customer using the system. It is to be understood, that any number of sites may be monitored with any number of work cells, machines, robots, and hardware interface modules. It is to be further understood that any number of different customers may be serviced with each customer having any number of different sites, work cells, machines, and hardware interface modules.

Multiple computing devices 26A, 26B, 26C are shown which may be used by individuals associated with the customer to monitor the various sites and industrial machines within the sites. Various individuals with different job functions may monitor industrial machines including quality control personnel, process engineers, managers or others.

Figure 2:
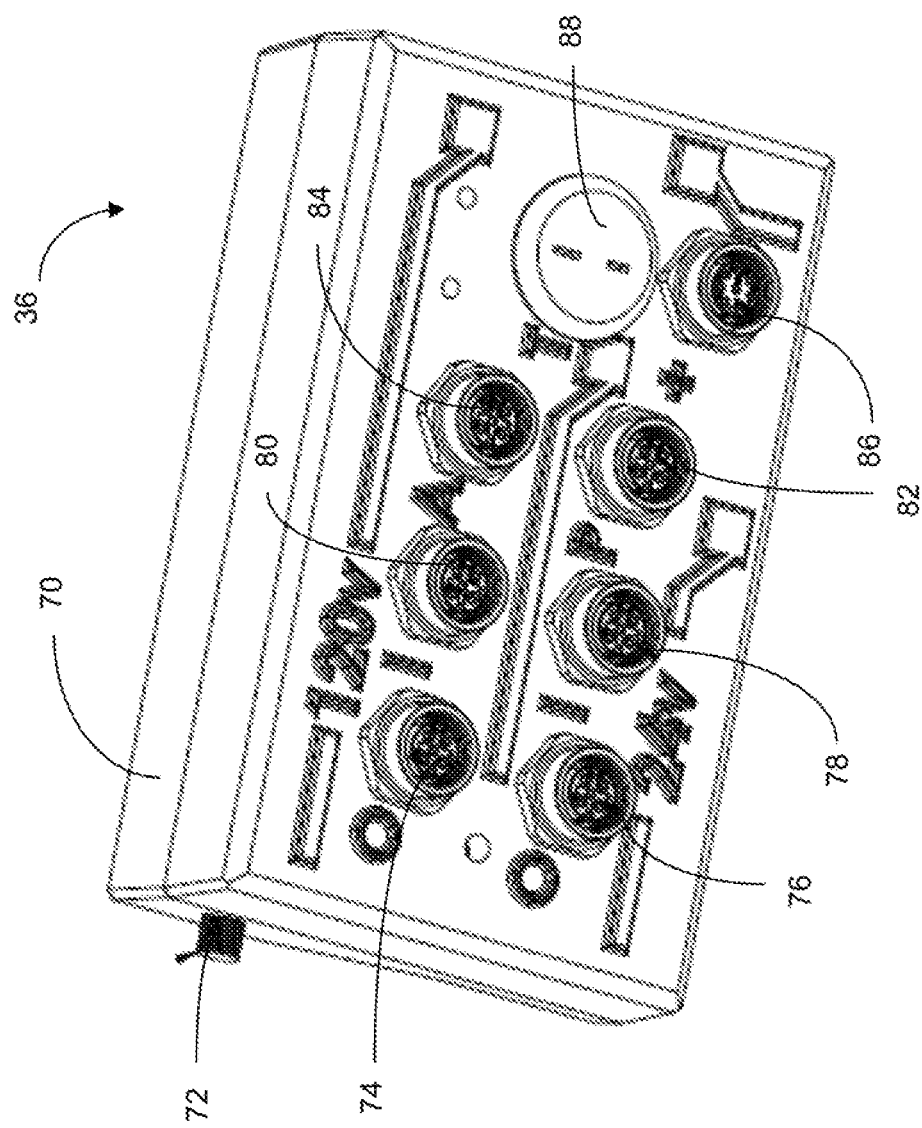
FIG. 2 illustrates one example of a hardware interface module for directly interfacing with an industrial machine.

FIG. 2 illustrates one example of a hardware interface module 36 which may be used to directly interface with a relay based or PLC based controller of an industrial machine. The hardware interface module 36 preferably has a housing 70 and inputs and outputs for different voltages. For example, a 24 V output port 76 and a 24 V input port 78 may be provided. Similarly, a 120V output port 74, and a 120 V input port 80 may be provided. A power port 82 is also provided, as is an analog input port 84. A thermocouple input 88 is also provided as well as an expansion port 86 and may be used for connecting a thermocouple so that temperature associated with a machine may be measured. The expansion port 86 may be used to connect with additional hardware interface modules of the same or different type. An antenna 72 is also shown. The hardware interface module may use a wireless transceiver such as a Wi-Fi transceiver. The use of a wireless transceiver is particularly conducive for use within a manufacturing or other industrial environment as additional cabling is not an issue. However, an ethernet port or other type of network port or interface may be included if desired such as in environments where Wi-Fi communications is not desirable.

Although specific input and output ports are shown and described, it is to be understood that more or fewer ports may be present of the same type as those shown or of different types depending upon desired power requirements for input or output or sensor requirements. Preferably, the available ports are sufficient to provide at least cycling information for an industrial machine so that operation of the machine may be monitored. The hardware interface module may be used to directly interface with a relay based or PLC based controller of the industrial machine. Thus, the hardware interface module may be used with any number of different types of industrial machines regardless of their age or manufacturer.

Other examples of types of ports or connectivity may be present. The additional ports may provide for inline voltage of a desired voltage level, may be ports to connect other sensors such as humidity sensors, non-contact temperature sensors, or accelerometers. One use of an accelerometer may be to detect machine vibrations over time which may be relevant to machine operation. One or more connections may be available to add a battery, Bluetooth connectivity, or additional functionality as may be desirable for use with a particular machine or within a particular manufacturing environment.

Figure 3:
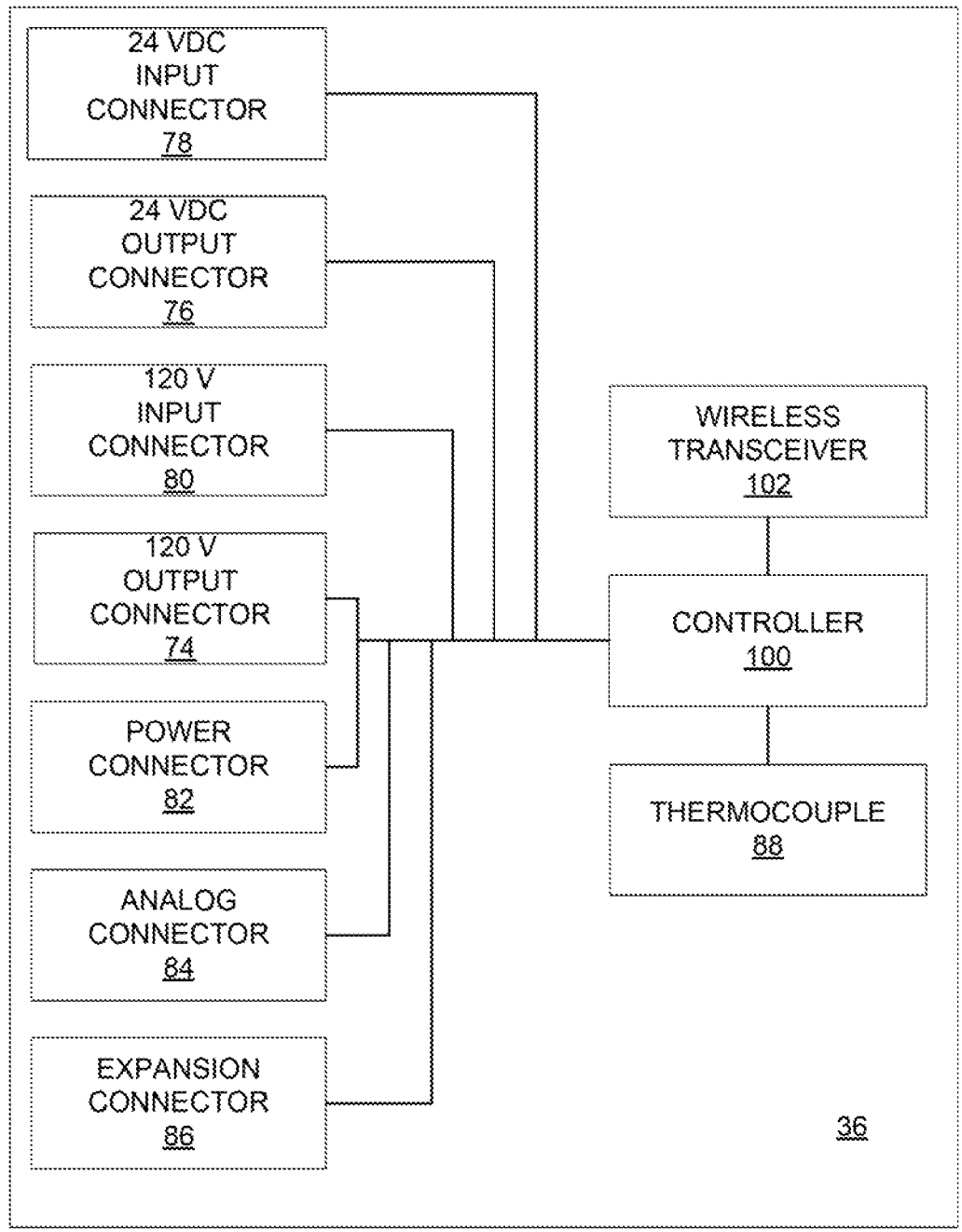
FIG. 3 is a block diagram illustrating electronic components of the hardware interface module shown in FIG. 2.

FIG. 3 is a block diagram illustrating electronic components of the hardware interface module shown in FIG. 2. The module may be constructed using an INTEL EDISON computer-on-module device. An intelligent control or controller 100 may be present which may be an Intel Atom CPU. A wireless transceiver 102 is also shown which may be operatively connected to the intelligent control or controller 100. The wireless transceiver 102 may be used to wirelessly communicate over a network. For example, the wireless transceiver 102 may be a Wi-Fi transceiver which is used to communicate between the hardware interface module and a cloud-based computing platform. Other types of network interfaces may be used included wired or wireless interfaces or both.

The thermocouple 88 is shown which is operatively connected to the controller 100. Examples of other types of sensors or sensor ports may include non-contact temperature sensors, humidity sensors, and accelerometer ports. One use of an accelerometer may be to detect machine vibration over time. Such machine vibration may be indicative of normal operation of the machine or a need to maintenance the machine. It is to be further understood that the analog connector 84 may also be used to interface with various sensors and that dedicated sensor ports for particular sensors need not be present.

One hardware interface module may be associated with each machine, although it is contemplated that more or fewer may be used. For example, one hardware interface module could be connected to two different machines or two hardware interface modules may be connected to a single machine.

The output ports or connectors may be used for any number of different purposes. These may include, for example, providing a visual alarm such as a light, an audible alarm, controlling a fan, or other purpose related to conveying information to individuals or affecting machine operation or the environment proximate the machine.

Figure 4:
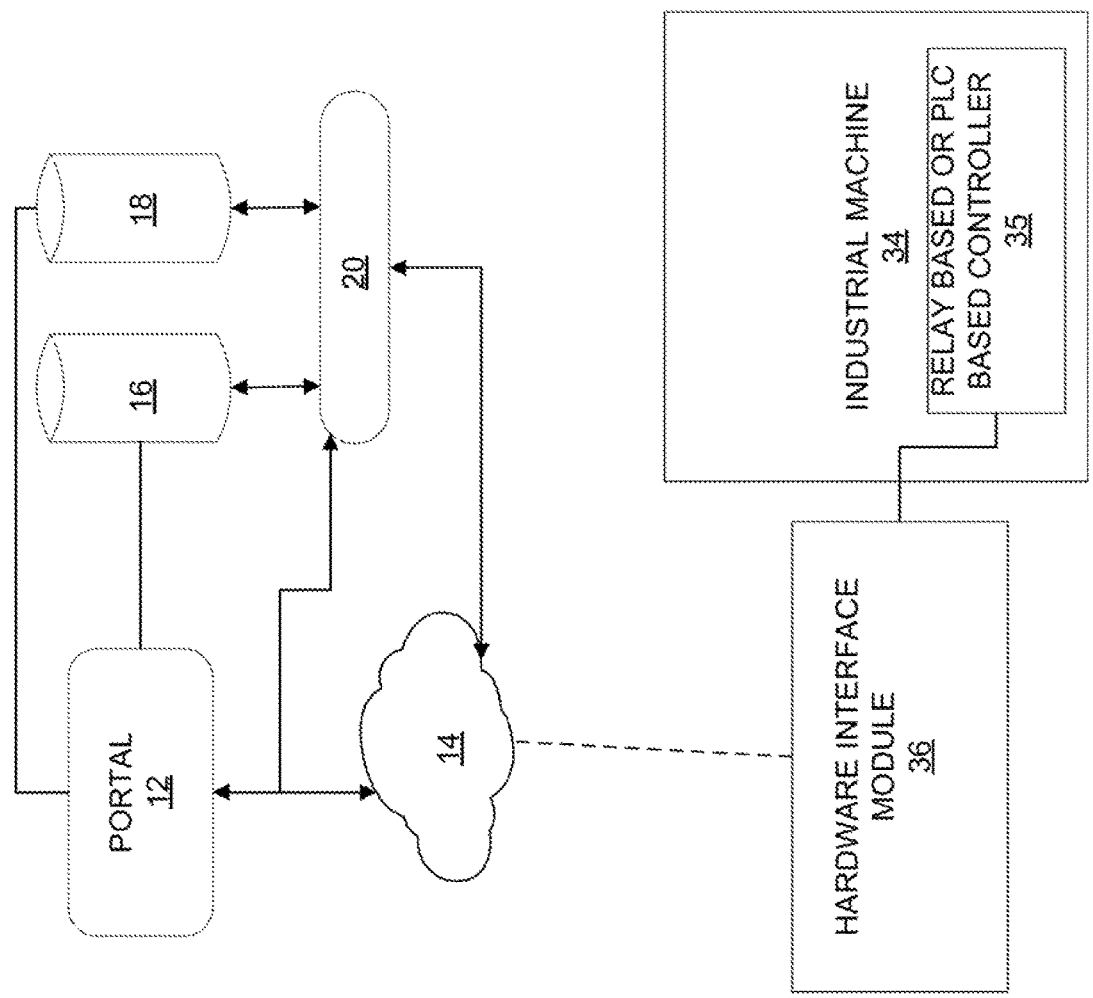
FIG. 4 illustrates another example of a system.

FIG. 4 illustrates another example of a system. As shown in FIG. 4 note that the relay based or PLC based controller 35 is directly interfaced to the industrial machine 34. Thus, for example, when power cycles to the industrial machine or a portion of the industrial machine which is directly interfaced to the hardware interface module 36, the hardware interface module 36 detects that power cycle. Thus, the hardware interface module may be connected to any number of different types of industrial machines regardless of manufacturer, type, or age. The hardware interface module 36 may be connected over a cloud-based network 14 to a computing platform 20 with databases 16, 18 and portal 12 as previously explained.

Figure 5:
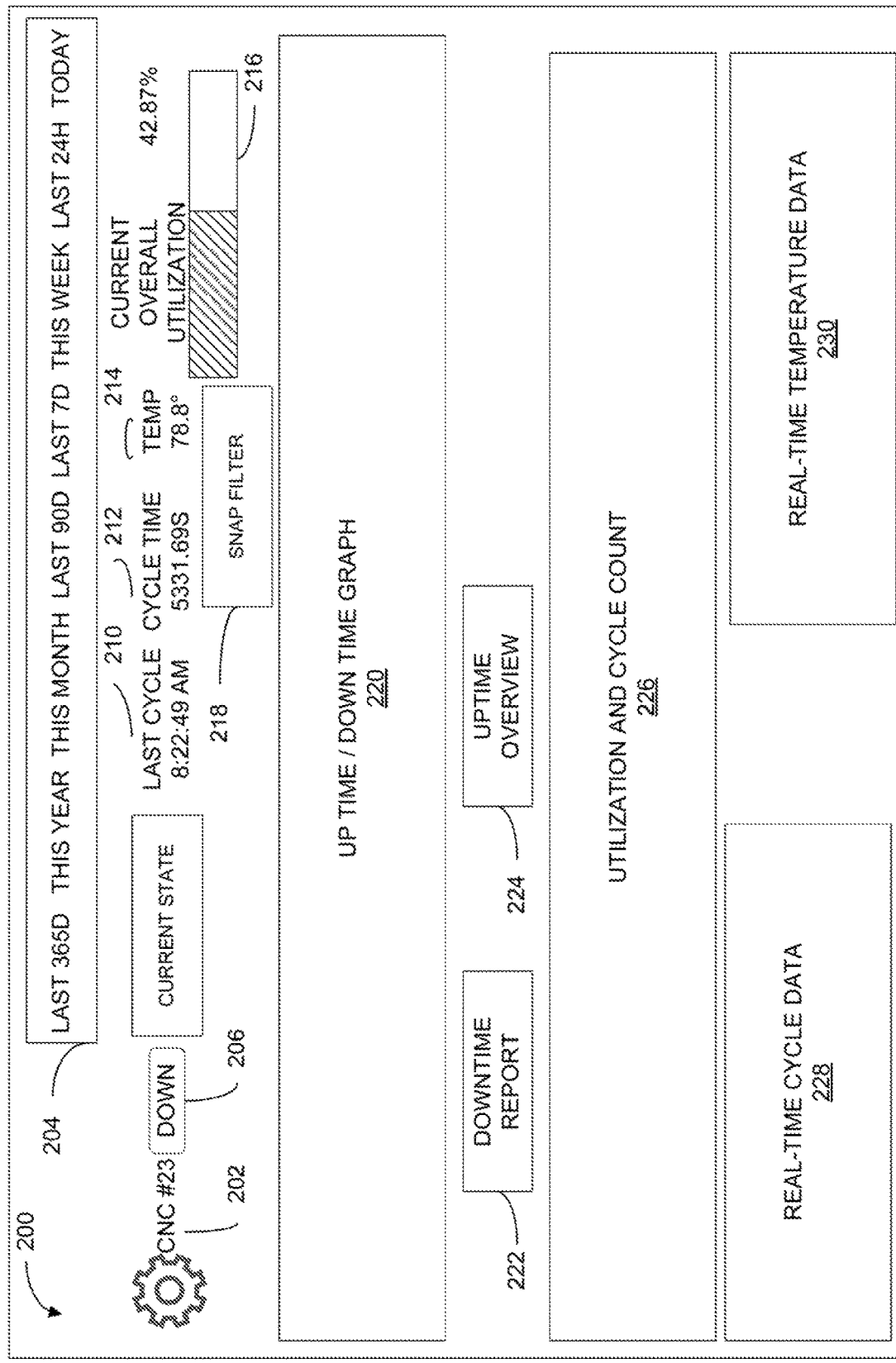
FIG. 5 illustrates one example of a user interface associated with a portal for monitoring an industrial machine.

FIG. 5 illustrates one example of a user interface associated with a portal for monitoring an industrial machine. The screen display 200 illustrates one example of visually conveying information about operation of an industrial machine to a user. A name or other identifier for an industrial machine 202 is shown. In this example, the name of the industrial machine is "CNC #23." A current state 206 for the industrial machine is also shown which in this case is "DOWN."

Historical information for the machine may be presented. A user may select at input 204 whether they would like to see the last 365 days, this year, this month, the last 90 days, the last 7 days, this week, the last 24 hours, or today. Of course, any number of other time periods may be shown in addition to or instead of these options. Allowing a user to see different time periods assists in conveying meaningful information which may be used in managing manufacturing operations. Other information which may be conveyed may include the time of the last cycle 210 for the industrial machine, the cycle time 212 or duration of the cycle. A temperature 214 associated with the machine, and a graph 216 showing current overall utilization of the machine. In addition to or instead of a graph, this information may be presented as a percent. An up time/down time graph 220 may also be shown to convey for the selected time period whether the state of the machine was up or down. A snap filter button 218 may be used to apply a filter corresponding to a selected time period.

A user may select to see a downtime report 222 or an uptime overview 224. A utilization and cycle count 226 graph or display may be provided. The data may include percentage of utilization for different periods of times as well as cycle counts for different periods of time. Real-time cycle data 228 may be showed in chart or graph form or otherwise. Real-time temperature data 230 for may be shown in chart or graph form or otherwise. Of course, the user interface may provide for displaying the same data in any number of different formats. In addition, any data that is collected may be presented to a user.

Figure 6:
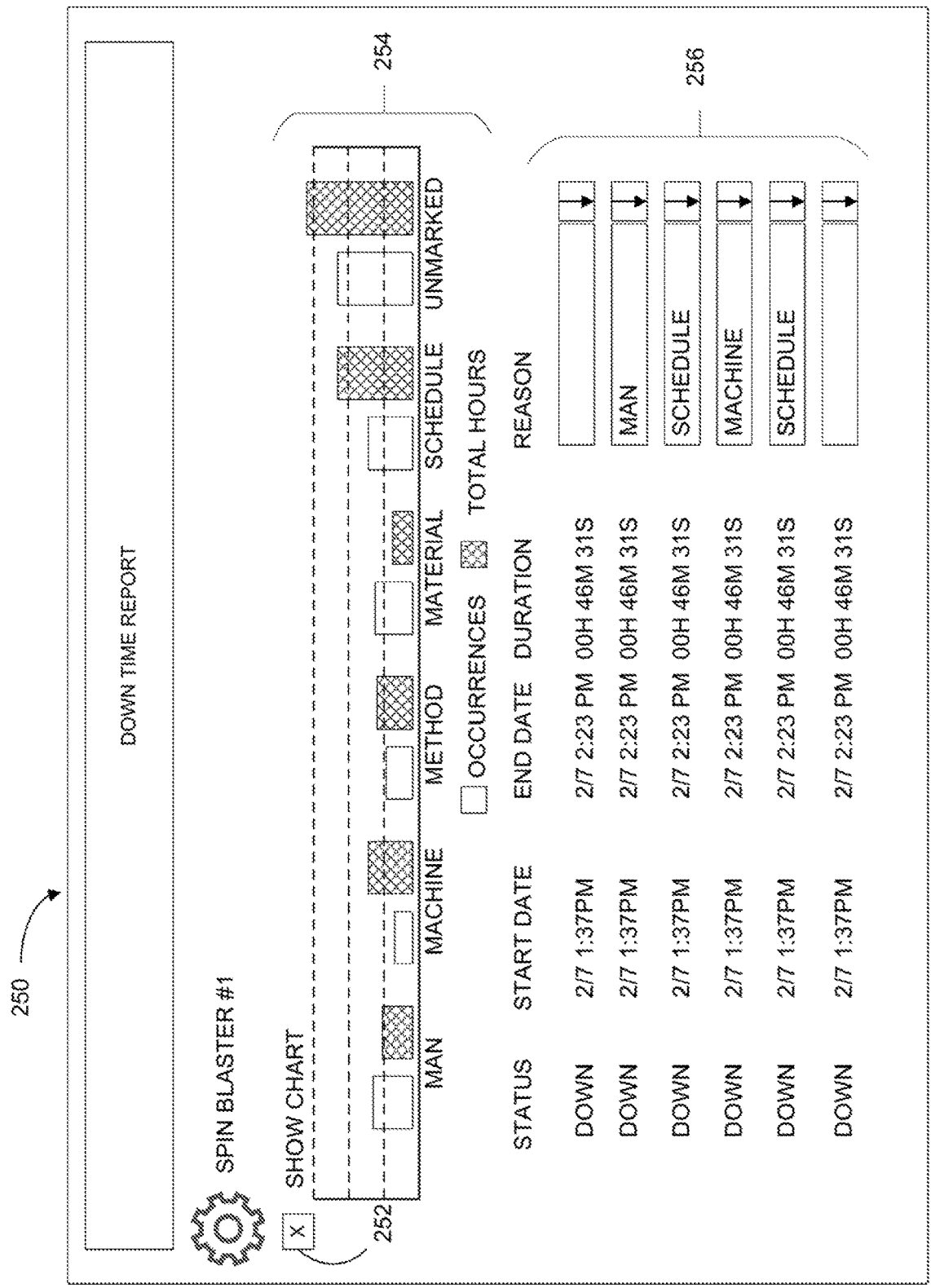
FIG. 6 illustrates one example of a down time report which may be presented on the user interface.

FIG. 6 illustrates one example of a down time report which may be presented on the user interface. As shown in FIG. 5, the down time report 250 is for an individual machine (SPIN BLASTER #1). The user may select a box 252 to show a chart 254. Here, the chart 254 shows the number of different occurrences of downtime as well as the total hours of down time which may be attributed to different causes or reasons. Below the chart 254 is a table 256 which for each occurrence of downtime illustrates when the industrial machine went down, when the status changed (i.e. back to "UP"), and the duration of the down time. In addition, a reason for the downtime is provided. A user with the appropriate access may set the reason for each occurrence of downtime. This may include whether the reason was human caused such as a lack of labor resource ("MAN"), a machine issue ("MACHINE"), a method ("METHOD"), a materials issue ("MATERIAL"), or if the machine was scheduled to be down ("SCHEDULE"). If a reason has not yet been provided the reason may be listed as "UNMARKED." The times considered to be downtime may include only those times which exceed a threshold considered to be excessive downtime. The threshold may be set by a user with the appropriate access rights and may be dependent upon the type of machine, operating environment, and/or user preferences.

In addition to the dashboard-type display of information, alarm state information may be defined. Alarm states may include, without limitation, excessive downtime, temperature thresholds or other information. When alarm states are reached, different types of alarms may be provided according to alarm settings. These may include email notifications, text notifications, mobile app notifications, or other types of notifications. In addition, where lights or other type of visual and/or audible alarms are operatively connected to one of the hardware interface modules, these alarms may also be activated if desired.

Figure 7:
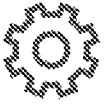
FIG. 7 illustrates an online process that may be used to register different interface modules.

As shown in FIG. 7 an online process may be used to register different interface modules. A screen display 260 is shown which may be used as a part of this process. The process may include collecting information 262 about each industrial machine associated with a hardware interface module. Such information 262 may include the manufacturer or make of the industrial machine, the model of the industrial machine, the location or site where the industrial machine is used, and/or other information which may be used to identify the machine and its location. Notes may be provided for additional information not otherwise provided for. Identifiers 264 for the hardware interface modules may also be entered. Although one particular method of hardware interface module registration is shown, it is to be understood that this registration may be achieved in numerous alternative ways.

Information about the machine obtained during the registration process may be used for a variety of different purposes. One such purpose is to provide users with comparative information. Thus, where there are multiple machines of the same type and of the same manufacturer the performance over time of these machines may be compared to provide insight into why one machine is underperforming or overperforming relative to one or more machines of the same type. This may assist in identifying maintenance issues which can be addressed. This may assist in identifying environment issues which may be addressed, or otherwise assist in identifying sources of problems. In addition, when a machine is down for maintenance, the reasons why the machine is down for maintenance may be recorded and stored in the system. This may assist in determining when future occurrences of maintenance may occur and when replacement parts may be needed. Importantly, information may also be aggregated for multiple machines of the same type including that which is at different sites and which is owned/operated by different unrelated entities. By sharing this aggregated information between multiple businesses which use the cloud-based services, additional insights are accessible which have not otherwise been. Thus, information may be provided which allows for better operation of a machine, better prediction of when a machine may need maintenance, better information to determine whether or not to replace a machine, and information regarding whether to buy a particular machine from a particular manufacturer based on its relative performance to competitive machines. The collection of this information is all enabled by the ability to directly interface with industrial machines which have relay based or PLC based controllers and in a manner which is independent of proprietary systems from particular manufacturers.

Where data is aggregated across different entities or enterprises, it may be aggregated in a manner such that a user may not access data specifically associated with other entities or enterprises, but only data which does not provide information sufficient to identify other entities or enterprises. Thus, privacy is maintained.

FIG. 8 is an example screen display 300 of a user interface that allows for setting up an organization and its industrial machines or devices. As shown in FIG. 8, a user may construct a tree or hierarchal chart 302 showing information about an organization such as a company name and the industrial machines or devices associated with the organization. Administration information may include team settings and functionality to manage a team. This may include adding, deleting, or editing team members. Invitations to prospective members of a team may also be sent and otherwise managed. Information tracked may include the location of each facility for a company within an organization as well as locations within the facility. For example, as shown in FIG. 8 there is an "EAGLE WATCH" facility and a "FOUNDRY" facility. At the "EAGLE WATCH" location there is both a "MACHINE SHOP" and a "PATTERN SHOP." Also, as shown in FIG. 8, a number of different types of industrial machines are shown within a tree structure. What is shown is representative and information regarding an organization, its facilities and locations within the facilities may be shown in alternative manners in various ways including graphically, textually, or otherwise. Other information that may be collected may include the hours per day operation as well as the days per week of operation. A user may thus specific relevant information about each facility, locations within each facility, machines at each location, hours of operation, and other information to assist in monitoring or managing industrial machines or other equipment.

The invention is not to be limited to the particular embodiments described herein. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes or methods of the invention. It is understood that any other modifications, substitutions, and/or additions can be made, which are within the intended spirit and scope of the invention.

What is claimed is:

1. A method for remote monitoring of an industrial machine having a relay based or PLC based controller, the method comprising:
providing a hardware interface module for directly interfacing with the relay based or PLC based controller of the industrial machine;
directly interfacing the hardware interface module with the relay based or PLC based controller to identify in real-time occurrence of power cycles of the industrial machine;
performing a registration process through a portal accessible through a network, wherein the portal is associated with a computing platform remote from the industrial machine, and wherein the registration process includes collecting an identifier for the hardware interface module through the portal and information about the industrial machine through the portal and wherein the information about the industrial machine includes a location where the industrial machine is used and at least one of a manufacturer of the industrial machine and a model of the industrial machine;
communicating the occurrence of the power cycles of the industrial machine detected with the hardware interface module to a database in operative communication with the portal and storing the occurrence of the power cycles within the database;
providing a user interface indicative of performance of the industrial machine based on the power cycles of the industrial machine detected with the hardware interface module and stored in the database;
communicating through the user interface instances where the power cycles indicate the industrial machine is down for longer than a threshold period of time, a start date indicating a date the industrial machine went down, an end date indicating a date the industrial machine was back up and a duration indicating how long the industrial machine was down;
receiving through the user interface classification of reasons for the instances wherein the power cycles indicate the industrial machine is down for longer than the threshold period of time and wherein the user selects the classification of the reasons from a set comprising a human caused reason, a machine issue reason, a materials issue reason and a scheduled downtime reason; and
aggregating data for a set of industrial machines wherein the industrial machine is within the set of industrial machines and presenting resulting aggregated data for the set of industrial machines through the user interface.

2. The method of claim 1 further comprising directly interfacing the hardware interface module with the relay based or PLC based controller to monitor temperature associated with the industrial machine.

3. The method of claim 1 wherein the aggregating the data is based on a type of the industrial machine as indicated by the manufacturer and the model and wherein the method further comprises analyzing the data to provide for real-time benchmarking for the type of the industrial machine.

4. The method of claim 3 wherein the set of industrial machines are spread across a plurality of different facilities.

5. The method of claim 4 wherein the plurality of other industrial machines are further spread across different enterprises.

6. The method of claim 1 wherein the user interface further provides for describing an organization including facilities associated with the organization, the industrial machine, and a plurality of other industrial machine in a hierarchical manner.

7. A system for remote monitoring of an industrial machine having a relay based or PLC based controller, the system comprising:
a hardware interface module for directly interfacing with the relay based or PLC based controller of the industrial machine in order to identify in real-time occurrence of power cycles of the industrial machine;
an online portal operating on a computing platform and programmed to provide for registering the hardware interface module through a portal accessible through a network, wherein the computing platform is remote from the industrial machine;

a database in operative communication with the online portal;

wherein the online portal has an associated user interface indicative of performance of the industrial machine based on the power cycles of the industrial machine detected with the hardware interface module and stored in the database;

wherein the user interface further provides for receiving information as a part of a registration process which includes collecting an identifier for the hardware interface module through the portal and information about the industrial machine through the portal and wherein the information about the industrial machine includes a location where the industrial machine is used, a manufacturer of the industrial machine and a model of the industrial machine;

wherein the user interface provides for communicating to a user instances where the power cycles indicate the industrial machine is down for longer than a threshold period of time;

wherein the user interface provides for presenting a plurality of reasons for the instances wherein the power cycles indicate the industrial machine is down for longer than the threshold period of time;

wherein the user interface further provide for receiving a selection of one of the plurality of reasons for the instances wherein the power cycles indicate the industrial machine is down for longer than the threshold period of time, a start date indicating a date the industrial machine went down, an end date indicating a date the industrial machine was back up, a duration indicating how long the industrial machine was down and an authorized-user classification of the reasons from a set comprising a human caused reason, a machine issue reason, a materials issue reason and a scheduled downtime reason selected by the authorized user after the industrial machine went down; and wherein the user interface provides for displaying aggregating data for a set of industrial machines wherein the industrial machine is within the set of industrial machines and presenting resulting aggregated data for the set of industrial machines through the user interface and wherein the aggregation of the data is performed using the manufacturer of the industrial machine and the model of the industrial machine.

8. The system of claim 7 further comprises a temperature sensor operatively connected to the hardware interface module to monitor temperature associated with the industrial machine.

9. The system of claim 7 wherein the computing platform further provides for aggregating data based on type of the industrial machine and analyzing the data to provide for real-time benchmarking for the type of the industrial machine.

10. The system of claim 9 wherein the set of industrial machines are spread across different locations.

11. The system of claim 10 wherein the set of industrial machines are further spread across different enterprises.

12. The system of claim 7 wherein the user interface further provides for describing an organization including facilities associated with the organization, the industrial machine, and a plurality of other industrial machine in a hierarchical manner.

13. A system for remote monitoring of an industrial machine having a relay based or PLC based controller, the system comprising:

a hardware interface module for sensing in real-time occurrence of power cycles of a portion of an industrial machine with a relay based or PLC based controller, the hardware interface having a wireless transceiver for communication over a network;

an online portal operating on a computing platform and programmed to provide for registering the hardware interface module through a portal accessible through a network, wherein the computing platform is remote from the industrial machine;

a database in operative communication with the online portal;

wherein the online portal has an associated user interface indicative of performance of the industrial machine based on the power cycles of the portion of the industrial machine detected with the hardware interface module and stored in the database;

wherein the user interface further provides for receiving information as a part of a registration process which includes collecting an identifier for the hardware interface module through the portal and information about the industrial machine through the portal and wherein the information about the industrial machine includes a location where the industrial machine is used, a manufacturer of the industrial machine and a model of the industrial machine;

wherein the user interface provides for communicating to a user instances where the power cycles indicate the portion of the industrial machine is down for longer than a threshold period of time;

wherein the user interface provides for presenting a plurality of reasons for the instances wherein the power cycles indicate the portion of the industrial machine is down for longer than the threshold period of time;

wherein the user interface further provide for receiving a selection of one of the plurality of reasons for the instances wherein the power cycles indicate the portion of the industrial machine is down for longer than the threshold period of time, a start date indicating a date the portion of the industrial machine went down, an end date indicating a date the portion of the industrial machine was back up, a duration indicating how long the portion of the industrial machine was down and one of the reasons from a set comprising a human caused reason, a machine issue reason, a materials issue reason and a scheduled downtime reason.

14. The system of claim 13 wherein the user interface provides for displaying aggregating data for a set of industrial machines wherein the industrial machine is within the set of industrial machines and presenting resulting aggregated data for the set of industrial machines through the user interface and wherein the aggregation of the data is performed using the manufacturer of the industrial machine and the model of the industrial machine.

15. The system of claim 13 further comprising at least one sensor operatively connected to a controller of the hardware interface module and wherein the at least one sensor is an accelerometer to detect machine vibrations.

* * * * *